Oct. 29, 1929.   C. H. EDDY   1,733,118
COAL CHUTE
Filed June 4, 1928
Fig. 1,
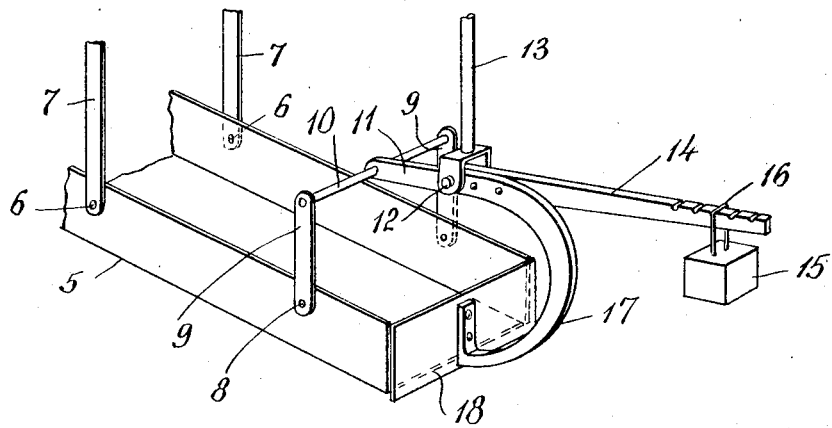
Fig. 2,
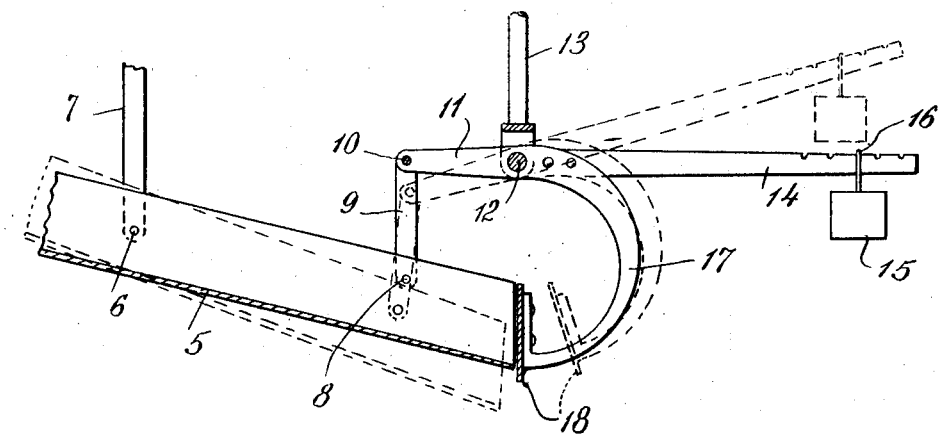
INVENTOR
Charles H. Eddy
BY
Pennie Davis Marvin & Edmonds
ATTORNEYS Patented Oct. 29, 1929

1,733,118

UNITED STATES PATENT OFFICE

CHARLES H. EDDY, OF OSWEGO, NEW YORK, ASSIGNOR TO DELAWARE, LACKAWANNA & WESTERN COAL COMPANY, OF NEW YORK, N. Y., A CORPORATION OF NEW JERSEY

COAL CHUTE

Application filed June 4, 1928. Serial No. 282,516.

This invention relates to conveyors and particularly to a chute in which the flow of material is retarded. The chute may be utilized for conveying and transferring a variety of materials, but it is adapted especially for the handling of coal.

Materials such as coal are subject to attrition and breakage in handling and the degradation which results amounts to a very considerable economic loss. The dust and fine coal, for example, are usually removed by screening and are less valuable than the lump coal or even worthless. The loss experienced in transferring coal through chutes is particularly noticeable because the velocity which the coal usually attains in the chute causes excessive attrition and also projects the coal with considerable force against the bed upon which it is delivered. Thus coal will run ordinarily through a chute which is inclined from three to six inches per foot and in traveling over a distance of five feet it attains a velocity which causes considerable degradation. With each foot of travel the velocity increases at a high rate.

It is the object of the present invention to provide an improved chute through which material such as coal may be transferred rapidly without attaining a high velocity.

A further object of the invention is the provision of a chute in which the flow of material is retarded without danger of clogging and thereby stopping the flow.

Other objects and advantages of the invention will be apparent as it is further understood by reference to the following specification and drawing, in which a preferred embodiment of the invention is described and illustrated.

In the drawing, Fig. 1 is a view in perspective of a conveyor embodying the invention, and Fig. 2 is a detail in section illustrating the mode of operation of the conveyor.

In carrying out the invention, I provide a chute suitably inclined and supported at its upper end so as to permit vertical adjustment of the lower end of the chute. The lower end of the chute is movably supported, and a gate is arranged in the chute or at the lower end thereof, the gate and the lower end of the chute being adapted to move simultaneously and correlatively. The gate normally affords an obstruction in the path of material moving through the chute and retards the movement of the material. By arranging the lower end of the chute and the gate so that the former moves downwardly while the latter moves upwardly and outwardly, choking of the outlet is avoided and the desired retardation of the material is maintained.

In the preferred form of the invention, the lower end of the chute and the gate may be connected, for example, to a lever which is suitably fulcrumed on a pivot. A movable counter-weight may be connected to the lever to permit adjustment. This adjustment is such that the gate normally forms an obstruction in the chute, for example at the outlet therefrom. When a certain amount of material accumulates in the chute the weight thereof is transmitted to the lever and acts against the counter-weight. The latter is raised as the end of the chute descends and the gate is simultaneously raised and moved outwardly from the chute. A portion of the material is discharged from the chute and is replenished by material flowing therethrough. The weight can be adjusted so that a suitable resistance is applied to the material in the chute without causing the outlet to become obstructed. Thus the material flows constantly but is not permitted to reach a velocity which would cause serious degradation.

The preferred form of the invention as illustrated in the drawing includes a chute 5 constructed of any suitable material and inclined at a proper angle, for example three to six inches to the foot, so that the material will flow readily therethrough. The upper end of the chute may be supported in any desired manner as, for example, by pivots 6 in hangers 7, so that the lower end of the chute may be raised or lowered. The lower end of the chute may be supported by pivots 8 and links 9 which are connected by a rod 10. The latter is supported on an arm or a lever 11, which is fulcrumed on a pivot 12 in a hanger 13. The lever 11 is provided with an extension 14 upon which a counter-weight 15 is movably supported. The extension 14 may be notched to receive a bail 16 on the counter-weight so that the counter-weight will remain in adjusted position. The arm 17 in the lever 11 carries a gate 18 which is adapted normally to abut the outlet end of the chute. In the position indicated in Fig. 1, the gate closes the lower end of the chute so that no material can flow therethrough.

The operation of the device is indicated in Fig. 2. Thus when material accumulates in the chute the weight thereof causes the lower end to descend to the position indicated in dotted lines. The lever 11 is thus swung upon its fulcrum carrying the gate 18 upwardly and outwardly to the position indicated in dotted lines. The outlet from the chute is thus opened to permit material to pass therefrom. By properly adjusting the weight 15 the gate may be caused to open to the desired extent to permit the escape of material but to retard the flow thereof at the same time so as to avoid excessive velocity of the material in the chute. The weight may be adjusted to permit any desired velocity of the particular material which is being handled. By thus restricting the velocity of the material traveling through the chute, excessive attrition is avoided and the material is prevented from leaving the chute at high speed with resulting breakage by impact upon the bed to which the material is delivered.

While I have described a preferred form of the invention, it is apparent that various changes may be made in the details of structure and arrangement of the various parts without departing from the invention or sacrificing any of the advantages thereof.

I claim:

1. A conveyor comprising an inclined chute, a gate, the gate and the lower end of the chute being supported to permit correlative movement thereof, and gravity means additional to the weight of the gate acting on the gate when the chute is moved relatively thereto to hold the gate in position to retard the flow of material through the chute.

2. A conveyor comprising an inclined chute, a gate, the gate and the lower end of the chute being supported to permit correlative movement thereof, and adjustable gravity means additional to the weight of the gate acting on the gate when the chute is moved relatively thereto to hold the gate in position to retard the flow of material through the chute.

3. A conveyor comprising an inclined chute, a gate, fulcrumed means connected to the gate and to the lower end of the chute to permit correlative movement thereof, and a counter-weight connected to the fulcrumed means to hold the gate normally in position to obstruct the flow of material through the chute.

4. A conveyor comprising an inclined chute, a gate, fulcrumed means connected to the gate and to the lower end of the chute to permit correlative movement thereof, and an adjustable counter-weight connected to the fulcrumed means to hold the gate normally in position to obstruct the flow of material through the chute.

5. A conveyor comprising an inclined chute, a gate, a lever connected to the gate and to the lower end of the chute, and a counter-weight supported by the lever to hold the gate normally in position to obstruct the flow of material through the chute.

6. A conveyor comprising an inclined chute, a gate, a lever connected to the gate and to the lower end of the chute, and a counter-weight adjustably supported by the lever to hold the gate normally in position to obstruct the flow of material through the chute.

7. A conveyor comprising an inclined chute, a gate, a lever, means connecting the lever to the gate and to the lower end of the chute, and a counter-weight supported by the lever to hold the gate normally in position to obstruct the flow of material through the chute.

8. A conveyor comprising an inclined chute, a gate, a lever, means connecting the lever to the gate and to the lower end of the chute, and a counter-weight adjustably supported by the lever to hold the gate normally in position to obstruct the flow of material through the chute.

9. A conveyor comprising an inclined chute, a gate, a lever, a pivotal support for the lever above the lower end of the chute, means connecting the lever to the gate and to the lower end of the chute, and a counter-weight supported by the lever to hold the gate normally in position to obstruct the flow of material through the chute.

10. A conveyor comprising an inclined chute, a gate, a lever, a pivotal support for the lever above the lower end of the chute, means connecting the lever to the gate and to the lower end of the chute, and a counter-weight adjustably supported by the lever to hold the gate normally in position to obstruct the flow of material through the chute.

In testimony whereof I affix my signature.

CHARLES H. EDDY.